United States Patent [19]

Muller

[11] 4,203,000
[45] May 13, 1980

[54] CABLE SLEEVE ASSEMBLY

[76] Inventor: Siegfried Muller, Dahlienstr. 25, 5800 Hagen 8, Fed. Rep. of Germany

[21] Appl. No.: 909,483

[22] Filed: May 25, 1978

[30] Foreign Application Priority Data

Jul. 13, 1977 [DE] Fed. Rep. of Germany ....... 2731578

[51] Int. Cl.² ............................................ H02G 15/08
[52] U.S. Cl. ...................................... 174/92; 174/93; 174/77 R; 174/88 R
[58] Field of Search ................... 174/91, 92, 93, 71 R, 174/77 R, 88 R

[56] References Cited

U.S. PATENT DOCUMENTS 3,916,086  10/1975  Gillemot et al. ................... 174/92 X

FOREIGN PATENT DOCUMENTS 2441668  8/1974  Fed. Rep. of Germany ............ 174/92
2542508  9/1975  Fed. Rep. of Germany ............ 174/92

*Primary Examiner*—Roy N. Envall, Jr.
*Attorney, Agent, or Firm*—Toren, McGeady and Stanger

[57] ABSTRACT

The cable sleeve permits lateral insertion of cables into cable insert parts. The cable insert parts are located within a pair of spaced sleeve heads interconnected by a tubular shaped supporting jacket. The assembled cable sleeve is enclosed within a plastic shrunk-on hose. Cable insert parts are connected to the sleeve heads and axially extending slots are provided through the sleeve heads into the cable insert parts. Similarly, the supporting jacket is split in the axial direction and the plastic hose has an axially extending slot with the juxtaposed edges of the slot being closable in a known manner after it is placed about the supporting jacket and sleeve heads.

8 Claims, 2 Drawing Figures

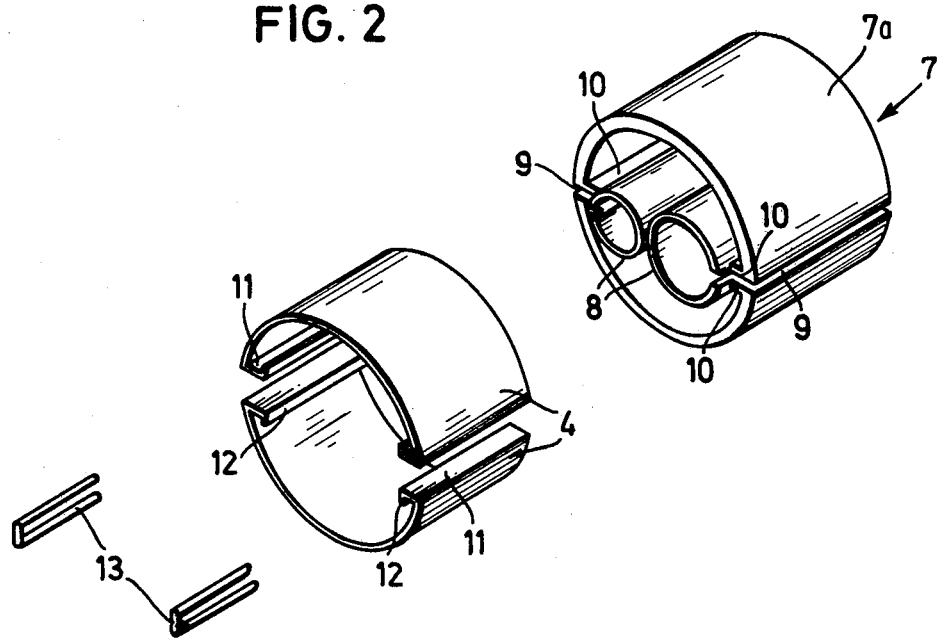

CABLE SLEEVE ASSEMBLY

SUMMARY OF THE INVENTION

The invention is directed to a cable sleeve assembly having an axially split metallic supporting jacket with a sleeve head adjacent each end of the jacket. Each sleeve head has at least one cable inlet part and a metallic supporting ring located in its interior. The supporting rings are disposed in form-positive engagement with the transverse ends of the supporting jacket. The sleeve heads are made of a suitable plastic in a manner so that only the portions forming the cable inlet parts can be shrunk. Further, a plastic shrunk-on hose is provided over the supporting jacket and the sleeve heads. The one or more cable inlet parts in each sleeve head is located radially inwardly from the axially extending surfaces of the sleeve head for receiving and holding cables extending through the sleeve.

Cable sleeves of this kind, note German Pat. No. P 25 42 508.5, can be very easily produced and are particularly effective in providing a sealing action between the cable inlet parts and the cables. This is particularly true in cables having a gas pressure, since the inwardly positioned cable inlets are pressed against the cable sheathing because of the gas pressure acting within the interior of the sleeve, thus, separation of the cable inlets from the cable is avoided.

Therefore, it is a primary object of the present invention to provide a cable sleeve assembly of the type described in which at least a part of the cable strands can be positioned through the sleeve in the unsevered condition, that is, at least a portion of the cable extending through the sleeve is not cut to permit the sleeve heads to pass axially over the cable strands.

In accordance with the present invention, an axially extending slot is provided through the outer wall of the sleeve head and into the cable inlet part so that a cable can be passed in its lateral direction through the slot into the inlet part. Furthermore, a plastic shrunk-on hose is provided for enclosing the cable sleeve and it includes an axially or longitudinally extending gap or opening which can be closed after assembly of the cable sleeve is completed.

Because of the manner in which the various parts of the cable sleeve assembly are constructed, it is possible, where cables are at least partially continuous, to slide each sleeve head including its cable inlet part onto the cable by spreading the sleeve head perpendicular relative to its axis in the region of the slot extending inwardly from the outer surface of the sleeve head into the cable inlet part. Alternatively, it would be possible to force a part or all of the cable strands laterally through the slot into the cable inlet part. Subsequently, the cable inlet parts can be shrunk onto the cables, as has been known previously.

To provide an effective sealing action, it is particularly advantageous if the slots through the sleeve head into the cable inlet parts are formed by a pair of webs extending generally radially inwardly from the sleeve head to the cable inlet part.

Further, for providing an effective sealing action, an adhesive layer is provided on the juxtaposed surfaces of the webs and it can also be provided on the inner surfaces of the cable inlet parts. During a heating action these adhesive layers melt.

Another characteristic of the invention is the division of the metallic supporting ring for facilitating its insertion into the sleeve head. Depending on the number of slots or cable inlet parts in the sleeve head, the supporting ring can be divided into a number of segments, that is, if two slots are provided into two cable inlet parts, then the supporting ring can be divided into two segments.

To provide a good seating action between the segments forming the metallic supporting ring and the surfaces in the sleeve head forming the slots, each segment-shaped part of the supporting ring is provided along its two axially extending edges with radially inwardly extending flanges so that the flanges fit against the webs extending between the outer sleeve part of the sleeve head and the cable inlet part.

Further, the radially inner edges of the flanges formed on the segment-shaped ring parts are provided with legs which extend approximately perpendicularly to the flanges. These legs are located adjacent to and abut the outer surfaces of the cable inlet parts.

Finally, generally U-shaped, slidable connecting clamps fit over the flanges on the ring parts and the webs of the supporting ring segments for assuring that the webs forming the slot provided with a layer of adhesive are tightly pressed together while the adhesive layer hardens.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is a perspective exploded view of the right hand sleeve head of FIG. 1 including two cable inlet parts and corresponding supporting ring segments and connecting clamps.

DETAIL DESCRIPTION OF THE INVENTION

Figure 1:
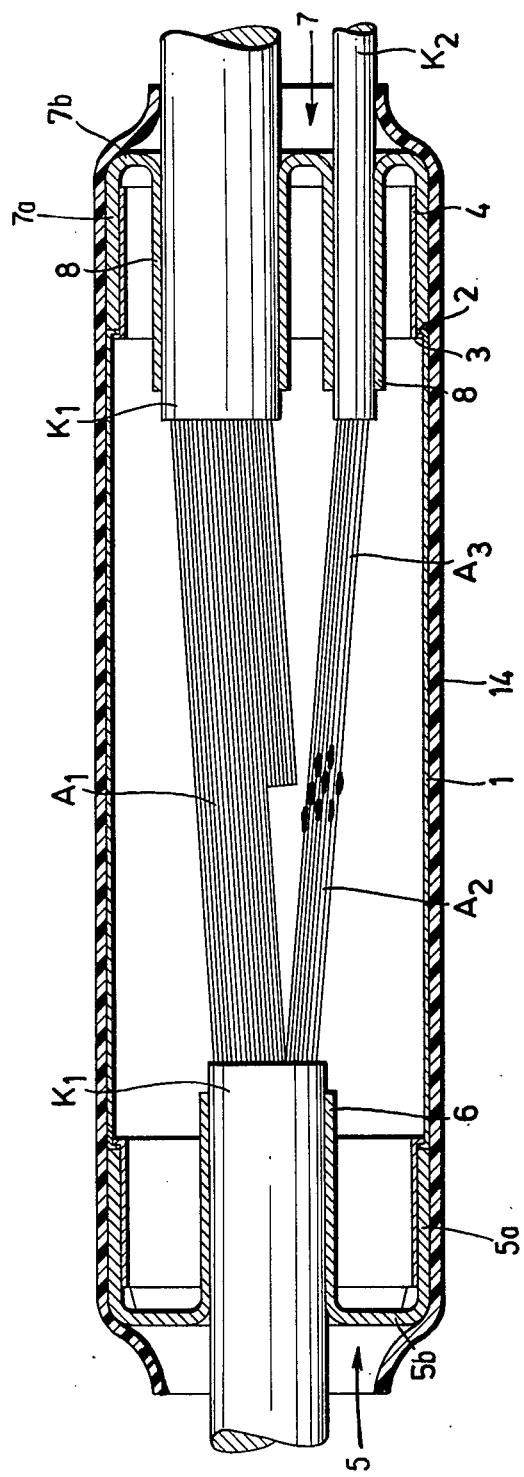
FIG. 1 is a longitudinal sectional view of a cable sleeve assembly embodying the present invention and including a sleeve head with a single cable inlet at one end and a sleeve head with a pair of cable inlets at the other end, and a main cable extends through the left hand sleeve head with mostly continuous cable strands extending to the right hand end, however, a small portion of the strands branch off intermediate the heads and are spliced to a smaller cable so that two cable inlet parts are provided in the right hand sleeve head.

In FIG. 1 the cable sleeve assembly consists of two metallic semi-cylindrical supporting jacket parts 1. Each of the opposite transversely extending ends of the jacket parts have an inwardly directed edge or flange 2 which engages or grips a similarly but outwardly projecting edge or flange 3 on metallic supporting rings 4. At one end of the jacket parts 1, the supporting ring 4 extends axially into a cylindrical sleeve head 5 containing a cable inlet part 6 secured to and positioned radially inwardly from the sleeve part 5a of the head 5. At the opposite end of the supporting jacket parts, the supporting ring 4 extends axially into a sleeve head 7 containing two cable inlet parts 8 secured to and spaced inwardly from the sleeve part 7a of the head 7. As can be seen in FIG. 1, each of the cable inlet parts 8 has a different diameter.

A cable $K_1$ enters the cable sleeve assembly through the cable inlet part 6 in the left hand sleeve head 5 of FIG. 1 and most of its strands $A_1$ extend unsevered through the cable assembly sleeve while the smaller portion of strands $A_2$ is spliced to the strands $A_3$ of a smaller cable $K_2$. The smaller cable $K_2$ extends through the right hand sleeve head 7 of FIG. 1 and is held within the smaller cable inlet part 8. In the right hand sleeve head 7 the cable $K_1$ extends through the larger diameter sleeve inlet part 8.

Since a major portion of the strands in the cable $K_1$ are continuous between the two sleeve heads 5, 7 each of these heads is provided with at least one separating slot 9 extending inwardly from the radially outer sleeve part 5a, 7a of the head to the radially inner cable inlet part 6, 8. This separating slot is, of course, also located in the transverse end wall or surface 5b, 7b of the sleeve head more remote from the jacket parts 1 and extending between the sleeve part and the cable inlet part.

In FIG. 2 the formation of the separating slot 9 in the right hand sleeve head 7 is illustrated. Sleeve head 7 has two axially extending cable inlet parts 8. Each cable inlet part has a corresponding separating slot 9. Each slot 9 is formed by a pair of circumferentially spaced webs 10 with each of the webs extending in the axial direction of the sleeve head 7 and projecting inwardly from the sleeve part 7a of the head inwardly to the cable inlet part 8. The slot 9 is defined by the juxtaposed inwardly facing surfaces of the webs 10. An adhesive layer, not shown, which melts when heated, is applied on the juxtaposed surfaces of the webs which define the slot. Additionally, a similar adhesive layer is applied to the inner surfaces of the cable inlet parts 6, 8.

Furthermore, FIG. 2 shows the metallic supporting ring 4 which is inserted into the sleeve head 7 when the cable sleeve is assembled. The supporting ring 4 is divided into two generally semi-cylindrical parts with each part having a pair of axially extending edges. A flange 11 extends essentially radially inwardly from each of these flanges and the inner end of each flange has a leg 12 extending generally perpendicularly to the flange. In the assembled positioned, the surface of the flanges 11 contact the corresponding outwardly facing surfaces of the webs 10 between the inner surface of the sleeve part 7a of the head 7 and the adjacent outer surface of the cable inlet part 8. With the supporting ring parts or segments inserted into the sleeve head 7, the U-shaped clamps 13 can be slid over the flanges 11 so that the webs 10 located between the flanges can be securely held together, particularly until the adhesive layer provides a bonding action between them.

As is known, the sleeve heads 5 and 7 have a stable shape in the region of their sleeve parts 5a, 7a and transverse end walls 5b, and 7b, even when heat is applied. The cable inlet parts 6, 8, however, can be shrunk upon the application of heat onto the outer surfaces of the cables $K_1$ and $K_2$. Accordingly, an excellent sealing action is provided by virtue of the adhesive layer formed on the inner surfaces of the cable inlet parts and the juxtaposed surfaces of the webs.

After the cable inlet parts 6 and 8 have been shrunk on the cables, a plastic hose 14 having an axially extending slot or gap is placed over the assembly of the sleeve heads 5, 7 and the jacket parts 1 so that it covers the cables extending outwardly from the opposite ends of the sleeve assembly. Subsequently, after the axially extending edges of the slot in the hose have been joined together, the hose is shrunk in a known manner by means of heat onto the sleeve heads 5, 7 and the supporting jacket parts 1 providing a sealed enclosure for the entire assembly.

This described embodiment can be changed in various ways without departing from the basic inventive concept. As an example, more than two cable inlet parts can be formed in one or both of the sleeve heads. In such an arrangement, the metallic supporting ring would be divided into an appropriate corresponding number of axially extending segments. The adhesive layer applied to the surfaces defining the separating slots in the sleeve heads can be applied only shortly before the facing web surfaces are placed in contact with another. Initially, individual cable inlet parts can be closed by means of a plug. At a later time this plug is removed after the hose has been cut open and is replaced by a cable to be inserted and spliced. Subsequently, the cable sleeve assembly is completed and closed by means of a new shrunk-on hose.

While specific embodiments of the invention have been shown and described in detail to illustrate the application of the inventive principles, it will be understood that the invention may be embodied otherwise without departing from such principles.

I claim:

1. Cable sleeve assembly including an axially split tubular shaped metallic supporting jacket having a pair of opposite ends spaced apart in and extending transversely of the axial direction thereof, an axially extending sleeve head positioned at each of the opposite ends of said jacket, each said sleeve head including at least one axially extending tubular shaped cable inlet part located within and extending in the axial direction of said sleeve head and said supporting jacket, a metallic supporting ring positioned in each said sleeve head and each said supporting ring disposed in form-positive engagement with the adjacent transverse end of said supporting jacket, said sleeve heads including a sleeve part spaced radially outwardly from and laterally enclosing said at least one cable inlet part and said sleeve part retaining its shape while said cable inlet part is shrunk when heat is applied to said sleeve heads, and a shrunk-on plastic hose laterally enclosing said supporting jacket and said sleeve heads for connecting them together, each said cable inlet part is located within and positioned inwardly from the sleeve part of said sleeve head for laterally enclosing a cable passing through the cable sleeve assembly, wherein the improvement comprises said cable inlet part having its axis extending in generally parallel relation with the axis of the sleeve part of said sleeve head, the outer surface of said cable inlet part spaced inwardly from the inner surface of said sleeve part, means interconnecting said cable inlet part and the sleeve part of said sleeve head within which it is positioned for forming an axially extending slot open between the exterior of said sleeve part of said sleeve head and the interior of said cable inlet part for inserting a cable laterally into said cable inlet part, and said plastic shrunk-on hose having an axially extending closable slot therein said means forming said slot comprise a pair of spaced webs extending radially inwardly from said sleeve part of said sleeve head to said cable inlet part with said webs extending in the axial direction of said sleeve part and said cable inlet part and with the space between said webs forming the slot open to the interior of said cable inlet part, each of the surfaces of said webs facing the other and forming the slot has an adhesive layer thereon, and said adhesive layer being meltable when heat is applied, and means for clamping together the facing surfaces of said webs.

2. Cable sleeve assembly, as set forth in claim 1, wherein each said supporting ring is divided in the axial direction by at least one axially extending slot for facilitating insertion of said supporting ring into said sleeve head.

3. Cable sleeve assembly, as set forth in claim 2, wherein said supporting ring located within a sleeve head having at least two axially extending slots formed therein is divided into separate axially extending ring segments with the number of said ring segments corresponding to the number of slots formed in said sleeve head.

4. Cable sleeve assembly, as set forth in claim 3, wherein each said supporting ring segment having a pair of axially extending circumferentially spaced edges, a flange extending radially inwardly from each said edge, the facing surfaces of said flanges when said segments are disposed within said sleeve head being in contact with a different one of said webs and being in contact with said web on the opposite side thereof from the side defining the slot in said sleeve head.

5. Cable sleeve assembly, as set forth in claim 4, wherein each of the radially inner edges of said flanges having a leg extending transversely of and from said flange in the direction opposite to the adjacent said web.

6. Cable sleeve assembly, as set forth in claim 5, wherein said means for clamping together comprises connecting clamps slidable over the adjacent said radially inwardly extending flanges located adjacent the slot in said sleeve head for securing toegether said webs defining the slot and positioned between said flanges.

7. Cable sleeve assembly, as set forth in claim 1, wherein each said sleeve head has a transverse end disposed adjacent to a transverse end of said supporting jacket, the opposite transverse ends of said supporting jacket each have an annular inwardly directed flange, said flange bearing against the adjacent transverse end of said sleeve head, and said supporting ring within each said sleeve head having an annular outwardly directed flange overlapping and in engagement with said flange on said supporting jacket.

8. Cable sleeve assembly, as set forth in claim 1, wherein each said sleeve head has a transverse end wall remote from said supporting jacket and extending across the sleeve part of said sleeve head, and said transverse end wall extending radially inwardly from said sleeve part into engagement with the transverse end of said at least one cable inlet part located remote from said supporting jacket.

* * * * *